Dec. 7, 1948.  C. W. DYER  2,455,662
MILLING ATTACHMENT FOR LATHES
Filed June 22, 1945  2 Sheets-Sheet 1
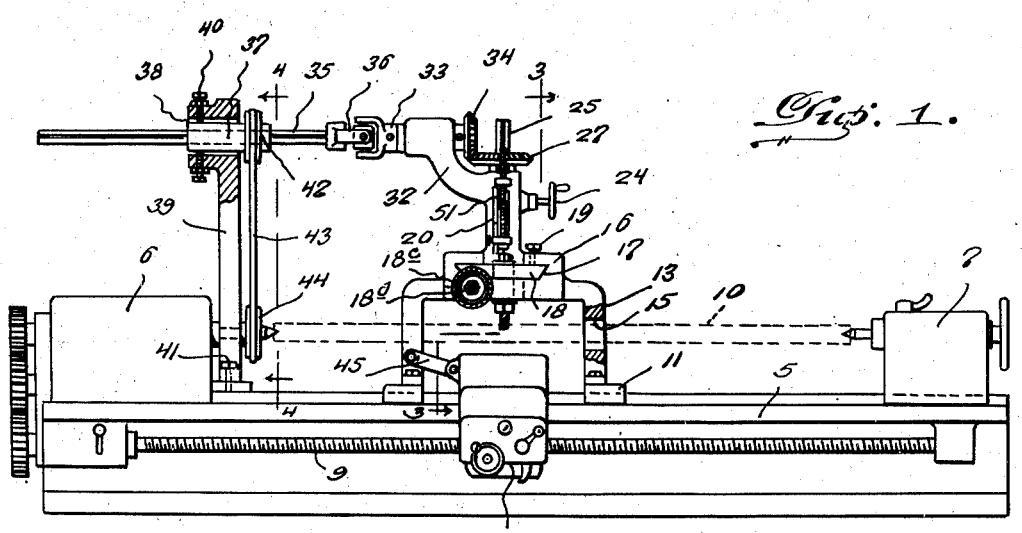
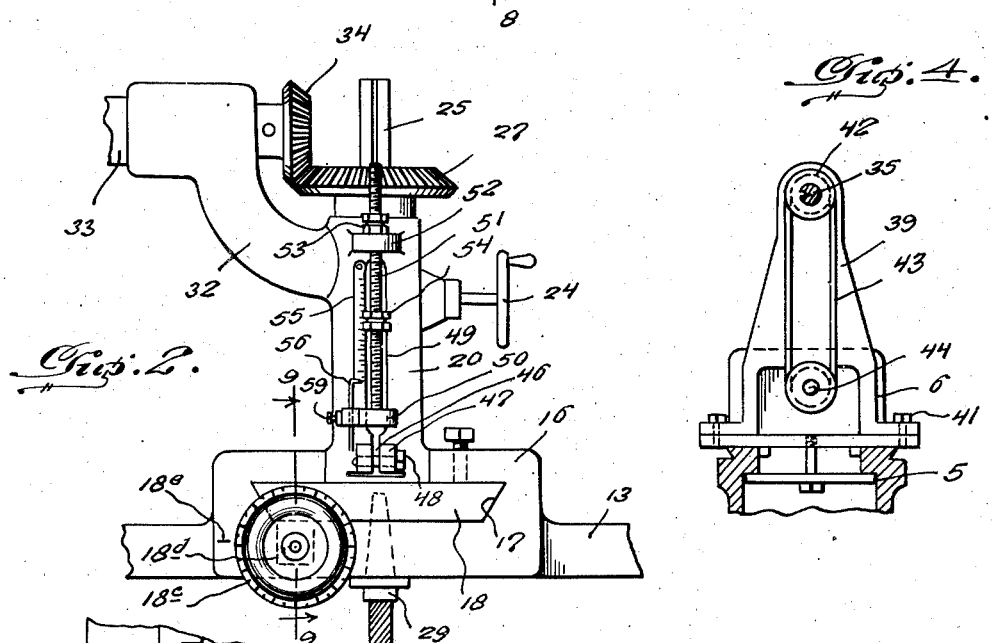
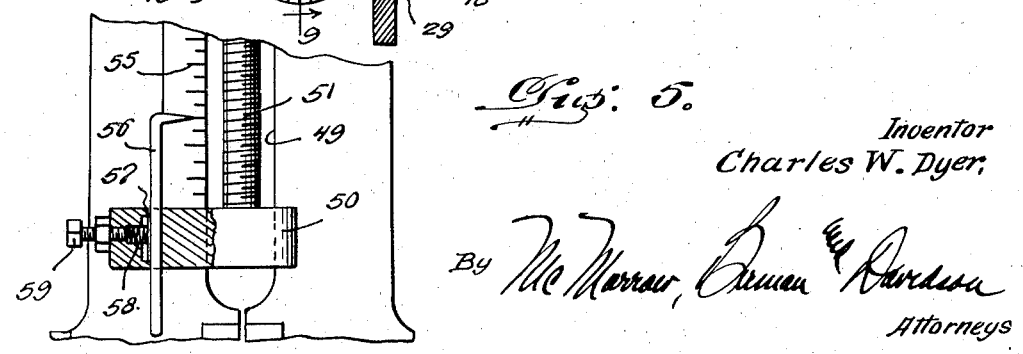
Inventor
Charles W. Dyer,
By
Attorneys

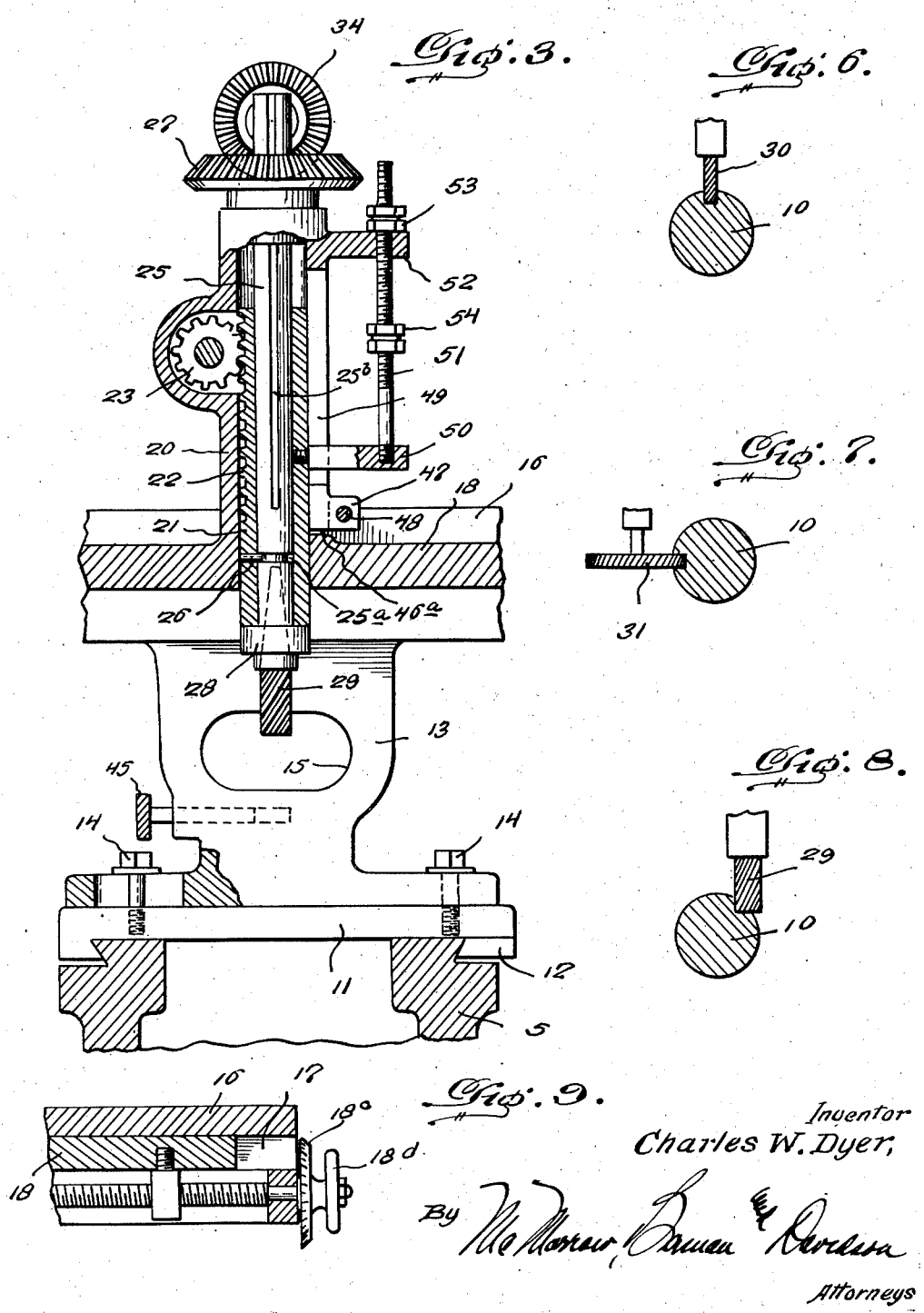

Patented Dec. 7, 1948

2,455,662

UNITED STATES PATENT OFFICE 2,455,662

MILLING ATTACHMENT FOR LATHES

Charles W. Dyer, Stratton, Maine

Application June 22, 1945, Serial No. 600,981

2 Claims. (Cl. 90—11)

The present invention relates to new and useful improvements in lathes, and more particularly to a milling, jig borer and drill attachment for lathes embodying means for operatively connecting a milling, boring or drilling shaft to the lathe head for operation thereby.

A further object of the invention is to provide a base supporting the shaft in a vertical position above the work mounted in the lathe and embodying means for adjusting the base transversely as well as longitudinally on the bed of the lathe.

A still further object is to provide means for continuously driving the shaft during either a longitudinal or transverse adjustment of the supporting base for the shaft.

Another object of the invention is to provide means for operatively connecting the shaft and supporting base to the conventional lathe compound for operation thereby, when desired.

A still further object is to provide a device of this character of simple and practical construction, which is efficient and reliable in operation, relatively inexpensive to manufacture, which may be easily and quickly installed in operative position on the lathe, and which otherwise is well adapted for the purposes for which the same is intended.

Other objects and advantages reside in the details of construction and operation as more fully hereinafter described and claimed, reference being had to the drawing forming part hereof, wherein like numerals refer to like parts throughout, and in which:

Figure 1 is a side elevational view.

Figure 2 is an enlarged side elevational view of the post for the vertical shaft.

Figure 3 is an enlarged vertical sectional view taken substantially on a line 3—3 of Figure 1.

Figure 4 is a vertical sectional view taken on a line 4—4 of Figure 1.

Figure 5 is an enlarged fragmentary detail of the indicator with parts in section.

Figures 6, 7 and 8 are details of various types of tools and cutters adapted for operative connection with the attachment and with the work shown in section, and Figure 9 is a fragmentary sectional view taken substantially on a line 9—9 of Figure 2.

Referring now to the drawings in detail, wherein for the purpose of illustration I have disclosed a preferred embodiment of the invention, the numeral 5 designates the lathe bed of a conventional form of lathe and at one end of which is mounted the lathe head 6 and with the tail stock 7 at the other end thereof.

The compound is indicated at 8 operatively mounted on the feed screw 9. The work, such as a shaft indicated at 10, is held in the usual manner between the lathe head 6 and tail stock 7.

The attachment forming the present invention comprises a base 11 having guides 12 at its lower side edges adapted for slidable engagement longitudinally on the bed 5, the base having legs 13 secured thereto by means of bolts 14 and rising in spaced relation to each other above the base, each of the legs having an opening 15 for receiving the shaft 10.

The upper portions of the legs 13 are connected by a head structure 16 having a transversely extending guide channel 17 formed therein in which a slide 18 is slidably mounted and secured in transversely adjusted position by means of a set screw 19. The slide 18 is adjusted by means of a feed screw 18a journaled in the head 16 and threaded through a lug 18b secured to the under side of the slide. An indicator 18c is secured to the outer end of the screw 18a together with a knob 18d, the indicator being readable with respect to a stationary mark 18e on the head 16 to indicate the position of adjustment of the slide on the head.

Rising from the slide 18 is a tubular post 20 in which a sleeve is slidably positioned, the sleeve having rack teeth 22 formed on one side operatively engaged by a pinion 23, the pinion being operated by means of a wheel 24 on the outside of the post 20.

A shaft 25 is journaled in the sleeve 21 and secured for vertical movement therewith by means of a pin 26 carried by the sleeve riding in a groove 25a in the shaft and a bevel gear 27 is journaled in the upper end of the post 20 and is slidably keyed on the upper end of the shaft 25 by means of a keyway 25b.

A conventional form of chuck indicated at 28 is attached to the lower end of the shaft 25 by means of which various types of boring, drilling and milling tools and cutters 29, 30 and 31 may be operatively connected to the lower end of the shaft, for performing various types of work on the shaft 10.

A bearing bracket 32 projects upwardly from one side of the post 20 in which a shaft 33 is journaled having a gear 34 attached to its front end for operative engagement with the gear 27, the rear end of the shaft 33 being connected to a shaft 35 by means of a conventional form of universal joint 36.

The shaft 35 is slidably mounted in a bearing 37 pivotally secured in an opening 38 in the upper end of an upright 39 by means of set screws 40, the lower end of the upright being secured to the rear end of the bed 5 by means of bolts or the like 41.

A pulley 42 is rotatably mounted at the front end of the bearing 37 and in which the shaft 35 is slidably keyed, the pulley 42 being driven by a belt 43 from a pulley 44 driven by the lathe head 6.

If desired, the rear leg 13 of the base 11 may be detachably connected to the lathe compound by means of a link 45 and by means of which the base 11, legs 13, head 16, post 20 and shaft 25 may be adjusted longitudinally on the bed 5 of the lathe under the control of the lathe compound 8 in the usual manner.

The shaft 25 may also be adjusted transversely of the lathe bed by releasing the set screw 19 and moving the slide 18 transversely in the head 16 by the manipulation of the feed screw 18a.

In order to take up wear between the sleeve 21 and post 20, the post is split vertically and horizontally at its lower end as indicated at 46 and 46a and provided with outwardly projecting ears 47 at its split edges in which a clamping screw 48 is threaded to contract the post to compensate for wear of the sleeve.

Above the split 46, the post 20 is formed with a vertical slot 49 in which a stud 50 is positioned for vertical sliding movement and threaded at its inner end into the sleeve 21. A bolt 51 is threaded at its lower end into the outer end of the stud 50 and is supported in a vertical position with its upper end slidable in a guide 52 projecting outwardly from the upper portion of the post 20. Upper and lower stop nuts 53 and 54 are adjustably threaded on the bolt 51 above and below the guide respectively to limit vertical adjustment of the sleeve 21.

To one side of the slot 49 is attached or marked a scale 55 with which a pointer 56 cooperates, the pointer being adjustable vertically in an opening 57 in one side of the stud 50 and frictionally secured in vertically adjusted position therein by a coil spring 58 forced against the pointer by a set screw 59.

In the operation of the device a desired cutting, milling or other suitable tool of a type as shown in Figures 6, 7 or 8 is attached in the lower end of the shaft 25 and the shaft or other work 10 secured in position through the openings 15 in the legs 13 by the lathe head 6 and tail stock 7. It will also be apparent that milling pieces may be held on the lathe compound 8 in a shoe, vise or other conventional method of attachment for use in jig boring jobs.

The base 11 may be adjusted longitudinally on the lathe bed 5 either manually or by attaching the base to the compound 8 as illustrated in Figure 1 for moving the cutter longitudinally of the work. The slide 18 carrying the post 20, and shaft 25 is adjustable transversely by means of the feed screw 18a and is locked in its adjusted position by the set screw 19.

The shaft 25 is driven from the lathe head 6 by means of the belt 43, shaft 35, and gears 34 and 27 and the universal joint 36 in the shaft 35 enables constant driving of the shaft 25 during either a vertical adjustment of the shaft 25 or a transverse adjustment thereof. The sliding keyway connection between the shaft 35 and the pulley 42 provided for the longitudinal adjustment of the attachment.

The shaft 25 and sleeve 21 may be secured against vertical movement in a desired vertically adjusted position by the stop nuts 53 and 54 on the bolt 51 or the nuts may be adjusted on the bolt to permit free raising and lowering of the sleeve and shaft.

Having thus described the invention, what I claim is:

1. An attachment for lathes of a type including a bed, a lathe head, and a screw-operated lathe compound, said attachment comprising a support mounted on the bed for longitudinal adjustment and including an opening for receiving work mounted in the lathe, a hollow post rising from the support, a vertical shaft journaled in the post and adapted for attaching a tool at its lower end, means for adjusting the post horizontally on the support to adjust the tool transversely of the work and means operatively connecting the shaft to the lathe head.

2. An attachment for lathes of a type including a bed, a lathe head, and a screw-operated lathe compound, said attachment comprising an inverted U-shaped support including a pair of legs, base plates at the lower ends of the legs slidably mounted on the ways of the lathe for longitudinal movement, said legs having openings for receiving work mounted on the lathe to extend through the support, a slide mounted for transverse adjustment on the support above the work, a post rising from the slide, a rotatable tool shaft mounted for vertical adjustment in the post, and an overhead drive connection between the upper end of the shaft and the lathe head.

CHARLES W. DYER.

REFERENCES CITED

The following references are of record in the file of this patent:

UNITED STATES PATENTS

| Number | Name | Date |
|---|---|---|
| 1,038,571 | Haase | Sept. 17, 1912 |
| 1,108,735 | FryKman | Aug. 25, 1914 |
| 2,116,122 | Ocenasek | May 3, 1938 |
| 2,375,789 | Hungerford | May 15, 1945 |